(12) United States Patent
Mein

(10) Patent No.: US 7,309,080 B2
(45) Date of Patent: Dec. 18, 2007

(54) EXTENDABLE ARM FOR A MOTOR VEHICLE

(76) Inventor: Gary W. Mein, 5407 Four Seasons Dr., Kalamazoo, MI (US) 49009

( * ) Notice: Subject to any disclaimer, the term of this patent is extended or adjusted under 35 U.S.C. 154(b) by 618 days.

(21) Appl. No.: 10/626,799

(22) Filed: Jul. 24, 2003

(65) Prior Publication Data

US 2005/0017491 A1    Jan. 27, 2005

(51) Int. Cl.
*B60S 9/22* (2006.01)
(52) U.S. Cl. .............................. 280/756.1; 280/763.1; 212/348
(58) Field of Classification Search ............... 280/762, 280/763.1, 765.1, 766.1, 769; 414/561; 212/348
See application file for complete search history.

(56) References Cited

U.S. PATENT DOCUMENTS

| | | | | |
|---|---|---|---|---|
| 2,571,858 A | * | 10/1951 | Garland | 212/231 |
| 3,480,109 A | * | 11/1969 | Eitel et al. | 182/148 |
| 3,825,107 A | * | 7/1974 | Cary et al. | 198/313 |
| 4,585,132 A | * | 4/1986 | Rathe et al. | 212/349 |
| 5,615,785 A | * | 4/1997 | Kaner | 212/180 |
| 5,752,799 A | * | 5/1998 | Carey et al. | 414/543 |
| 5,906,336 A | * | 5/1999 | Eckstein | 244/135 A |
| 6,007,289 A | * | 12/1999 | Kruse et al. | 414/462 |
| 6,230,741 B1 | * | 5/2001 | Woodling et al. | 137/615 |
| 6,496,766 B1 | * | 12/2002 | Bernold et al. | 701/50 |
| 6,550,624 B1 | * | 4/2003 | Irsh et al. | 212/299 |
| 6,757,958 B1 | * | 7/2004 | Baumann et al. | 29/469 |
| 6,820,980 B1 | * | 11/2004 | Romanoff et al. | 352/243 |
| 7,044,315 B2 | * | 5/2006 | Willim | 212/299 |
| 2004/0104192 A1 | * | 6/2004 | Stowasser et al. | 212/348 |
| 2004/0129663 A1 | * | 7/2004 | Willim | 212/177 |
| 2004/0247420 A1 | * | 12/2004 | Baumann et al. | 414/500 |
| 2005/0191049 A1 | * | 9/2005 | Chapman | 396/428 |

* cited by examiner

*Primary Examiner*—Jeff Restifo
(74) *Attorney, Agent, or Firm*—Robert J. Sayfie

(57) ABSTRACT

An extendable arm that extends from a police vehicle towards a pulled over vehicle. The arm allows for two-way communication or document transfer. The police officer can position the extendable arm while seated in the vehicle. The extendable arm includes a main shaft having first and second opposed ends. The first end is pivotally attached to the vehicle. A telescoping assembly extends from the second end. The assembly has a free end that extends and retracts away from and towards the main shaft. The free end can have an accessory mounted thereon, such as a two-way audio visual camera, or a container for the retention of driver's licenses. During operation the distal end can be positioned adjacent the driver's window or the police officer's window. The free end is retracted, and the shaft is placed in a stowed position adjacent the motor vehicle when not in use.

13 Claims, 17 Drawing Sheets

EXTENDABLE ARM FOR A MOTOR VEHICLE

FIELD OF THE INVENTION

The invention relates to an extendable arm for the outside of motor vehicles and more particularly, to an extendable arm to facilitate the passing of documents and facilitating communication between vehicles.

BACKGROUND OF THE INVENTION

Routine traffic stops by police officers generally require the officer to get out of the police vehicle. Such stops also require the officer to walk to, and stand next to the driver of the vehicle that is pulled over. This is usually on the shoulder or side of a highway or street. The officer then talks to, and can see the driver of the pulled over vehicle, including the driver's facial expressions. The officer can exchange documents and communicate with the driver.

A problem with this practice is that it leaves the officer unprotected if one of the vehicle's occupants wants to engage in a hostile act. Moreover, the officer typically has to stand close to the side of the road. This leaves the officer in an unprotected position in the event traffic comes too close.

Other conventional methods for police officers to communicate with drivers include use of a loud speaker. But the use of a loud speaker is only practical for one-way communication from a distance, and therefore not commonly used for most traffic stops. Use of the loud speaker does not allow the officer to obtain documents from the driver, such as a driver's license, and proof of insurance.

BRIEF SUMMARY OF THE INVENTION

This invention comprises an extendable arm that is mounted on, or within a motor vehicle, particularly police vehicles. Generally, after pulling over a vehicle on a highway or street, the police car will be behind the other vehicle. Here, and still seated in the police car, an officer can actuate the extendable arm.

The extendable arm is placed in a stowed position when not in use. The extendable arm stowed position can be mounted to a number of locations on the vehicle. For example, the extendable arm can be mounted underneath the front bumper, in front of the front bumper, or on the roof of the car. Other embodiments mount the extendable arm within the vehicle body to protect it from the elements and vandalism. The arm can then be deployed for use. The extendable arm can be deployed while the police car is stopped, or moving.

The present invention solves the problem of risks associated with officers standing near pulled over drivers and traffic. Use of the applicant's invention eliminates the need for a police officer to exit the vehicle. The officer can remain seated in the vehicle, and position an extendable arm of the applicant's invention. A free end of the arm is positioned adjacent the driver for various uses that include two way communication, document retrieval, identification, or weapons delivery. For example, the free end can have a two-way audio video-camera, a container for the receipt of drivers licenses, and other systems. It can then be re-positioned adjacent the police officer for the receipt of documents from a container.

Multiple embodiments of the extendable arm are disclosed herein. It will be understood that other objects and purposes of the invention, and variations thereof, will be apparent upon reading the following specification and inspecting the accompanying drawings.

BRIEF DESCRIPTION OF THE DRAWINGS

FIG. 2 also shows the first and second housings.

FIG. 14-C shows a drive motor for a ball-in-socket joint.

Figure 1A:
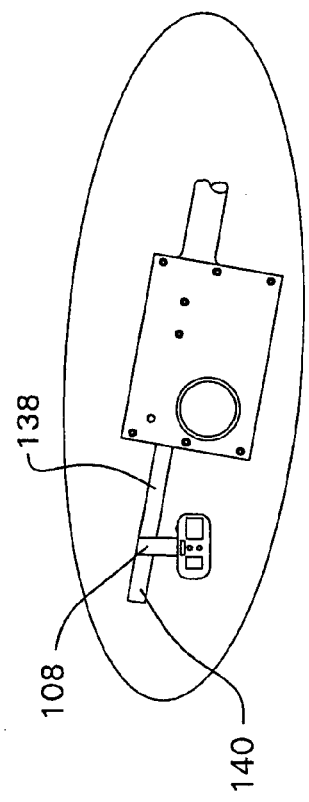
FIG. 1A shows the extendable arm in a partially retracted position.

Certain terminology will be used in the following description for convenience and reference only, and will not be limiting. For example, the words "upwardly," "downwardly," "rightwardly" and "leftwardly" will refer to directions in the drawings to which reference is made. The words "inwardly" and "outwardly" will refer to directions toward and away from, respectively, the geometric center of the system and designated parts. Said terminology will include the words specifically mentioned, derivatives, and similar words.

DETAILED DESCRIPTION

Figure 1:
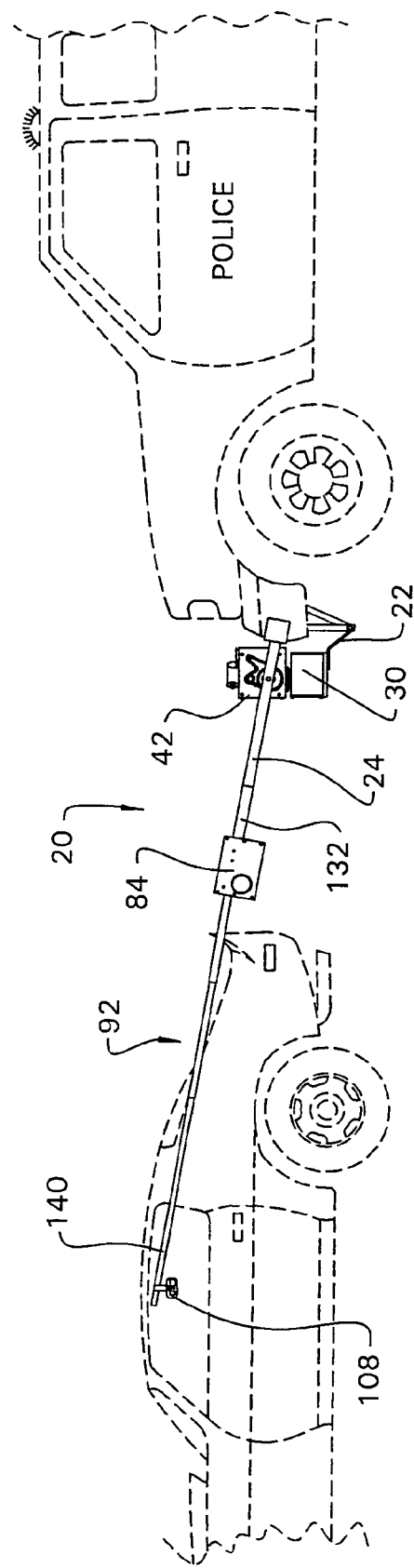
FIG. 1 shows the driver's side of a police motor vehicle using the extendable arm with the free end adjacent a pulled over driver.
Figure 2:
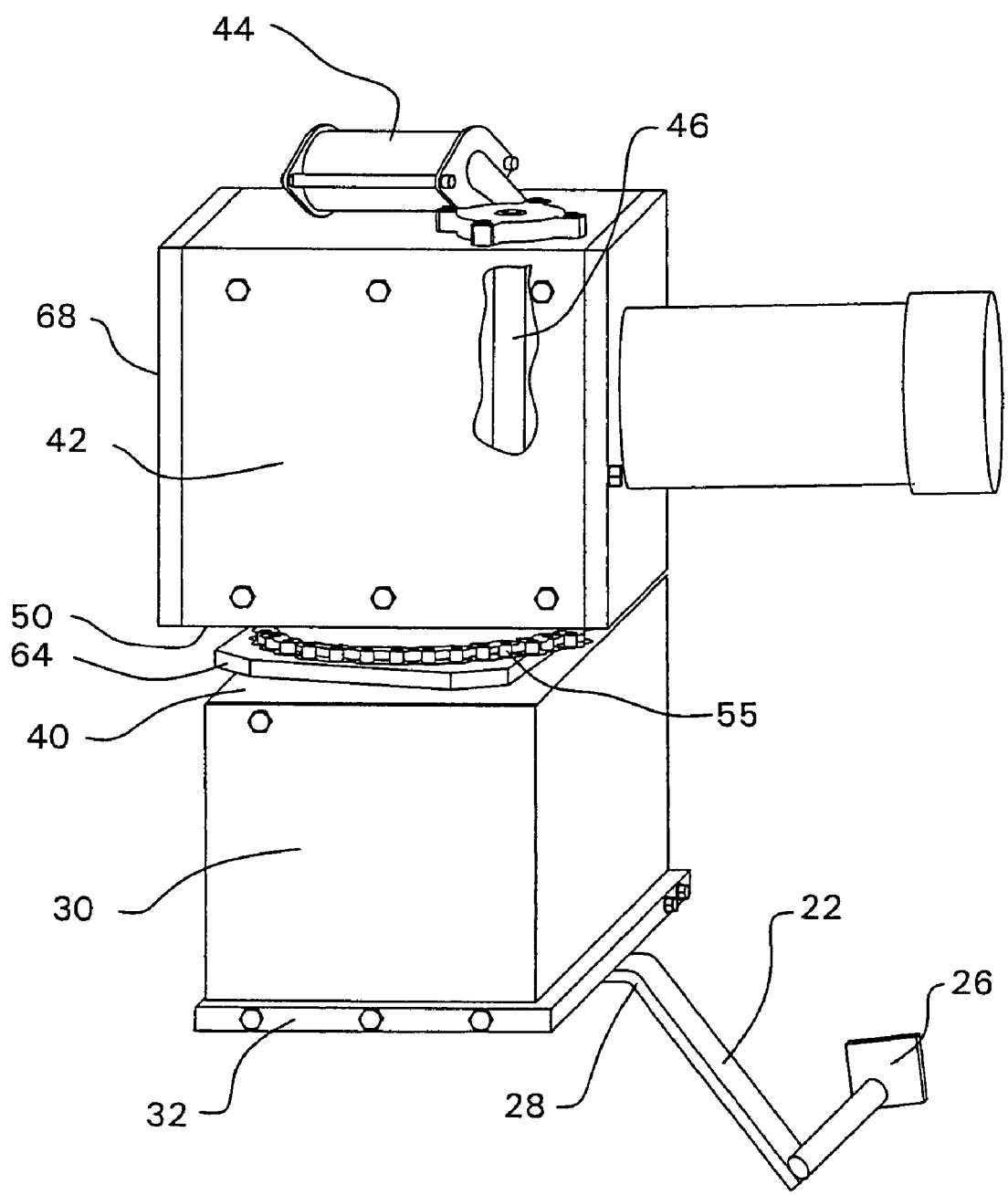
FIG. 2 shows the mounting bracket as mounted on a vehicle utility fixture, such as a fixture to receive snow plow blades.

Referring to FIG. 1, an extendable arm 20 is illustrated and includes a mounting bracket 22 and a main shaft 24. As seen in FIG. 2, the mounting bracket 22 is L-shaped and has a mounting bracket first part 26 secured to a vehicle utility fixture, such as a fixture for attaching snow plow blades. The mounting bracket first part 26 can also be secured directly to a vehicle frame. The mounting bracket 22 has a second part 28 disposed away from the vehicle frame. A flat base 32 is mounted to the mounting bracket second part 28. A bottom of a first cube shaped housing 30 is fixedly attached to the base 32.

Figure 3:
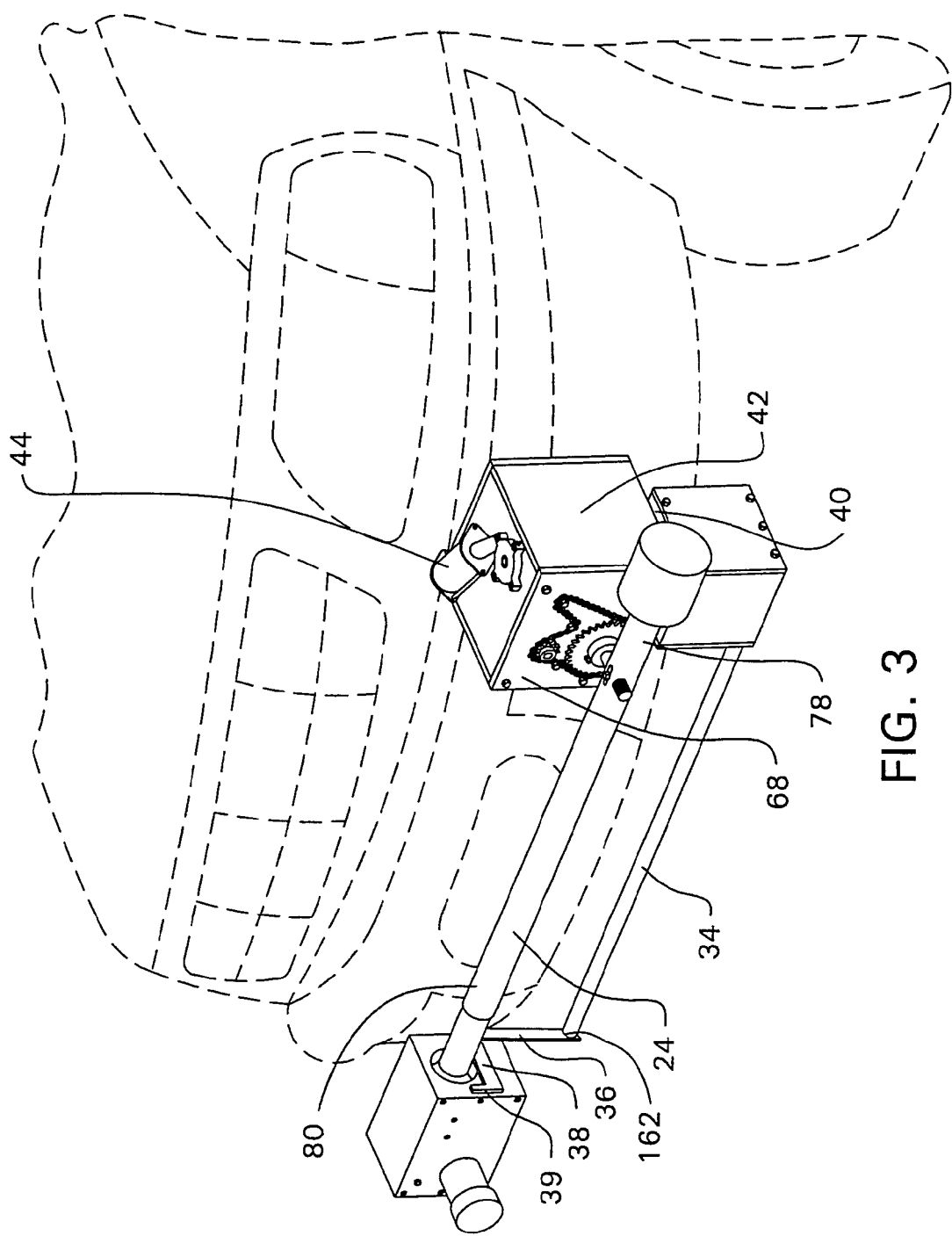
FIG. 3 is a view showing the extendable arm in a stowed position in front of the front bumper.

Referring to FIG. 3, an elongate rod 34 extends substantially horizontally from the mounting bracket 22, under the base 32 (not shown in FIG. 3) to the passenger side under the front bumper, terminating at a support point 162. Extending upwardly from the rod support point 162 is a L-shaped support bracket 36. The support bracket 36 has a forwardly extending finger 38. The main shaft 24 rests on the finger 38 when not in use. An upstanding tip 39 is integrally disposed on the front of the finger 38, to prevent the main shaft 24 from slipping off the front of the finger 38.

Figure 4:
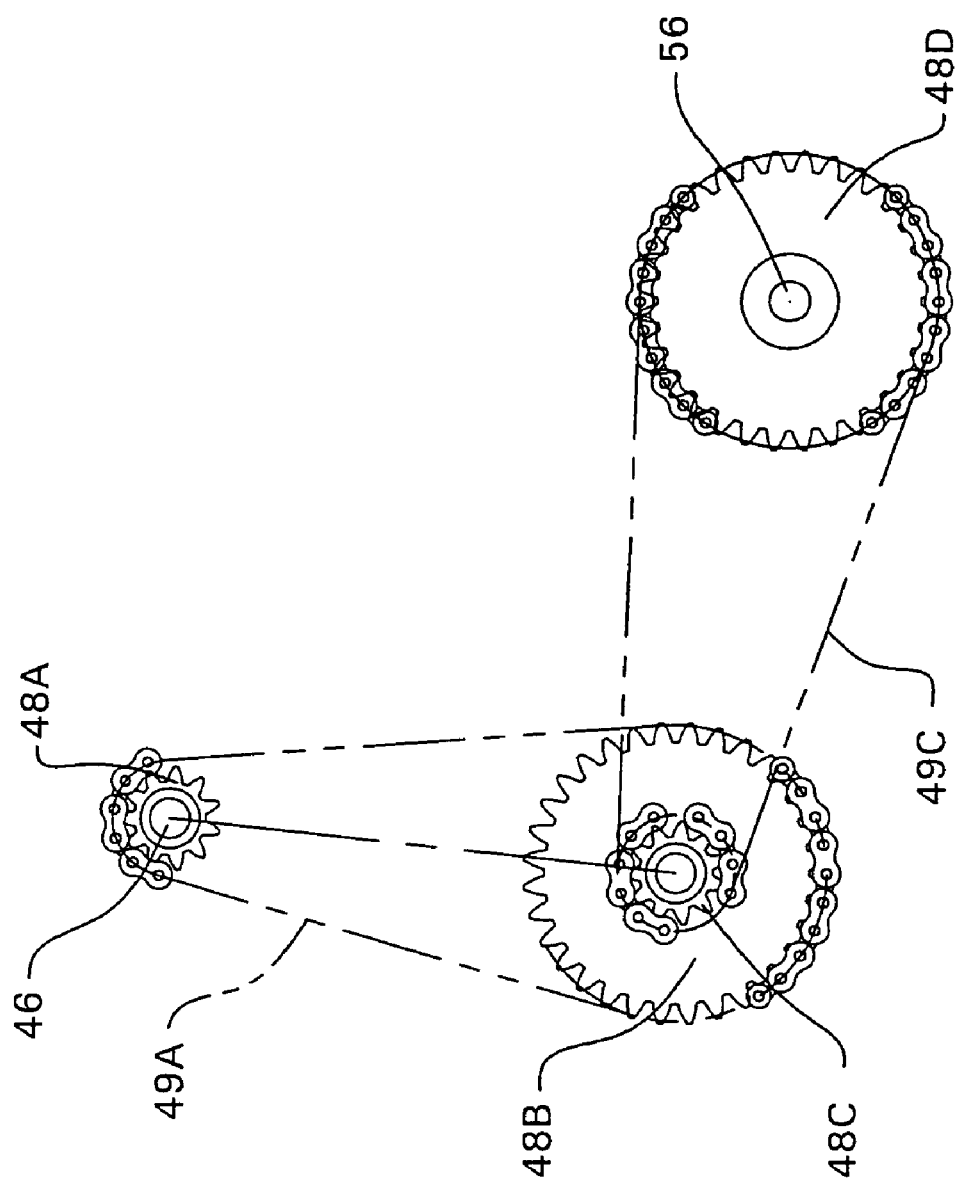
FIG. 4 is a schematic of the gears rotatably mounted on the top side of the bottom panel of the second housing.
Figure 5:
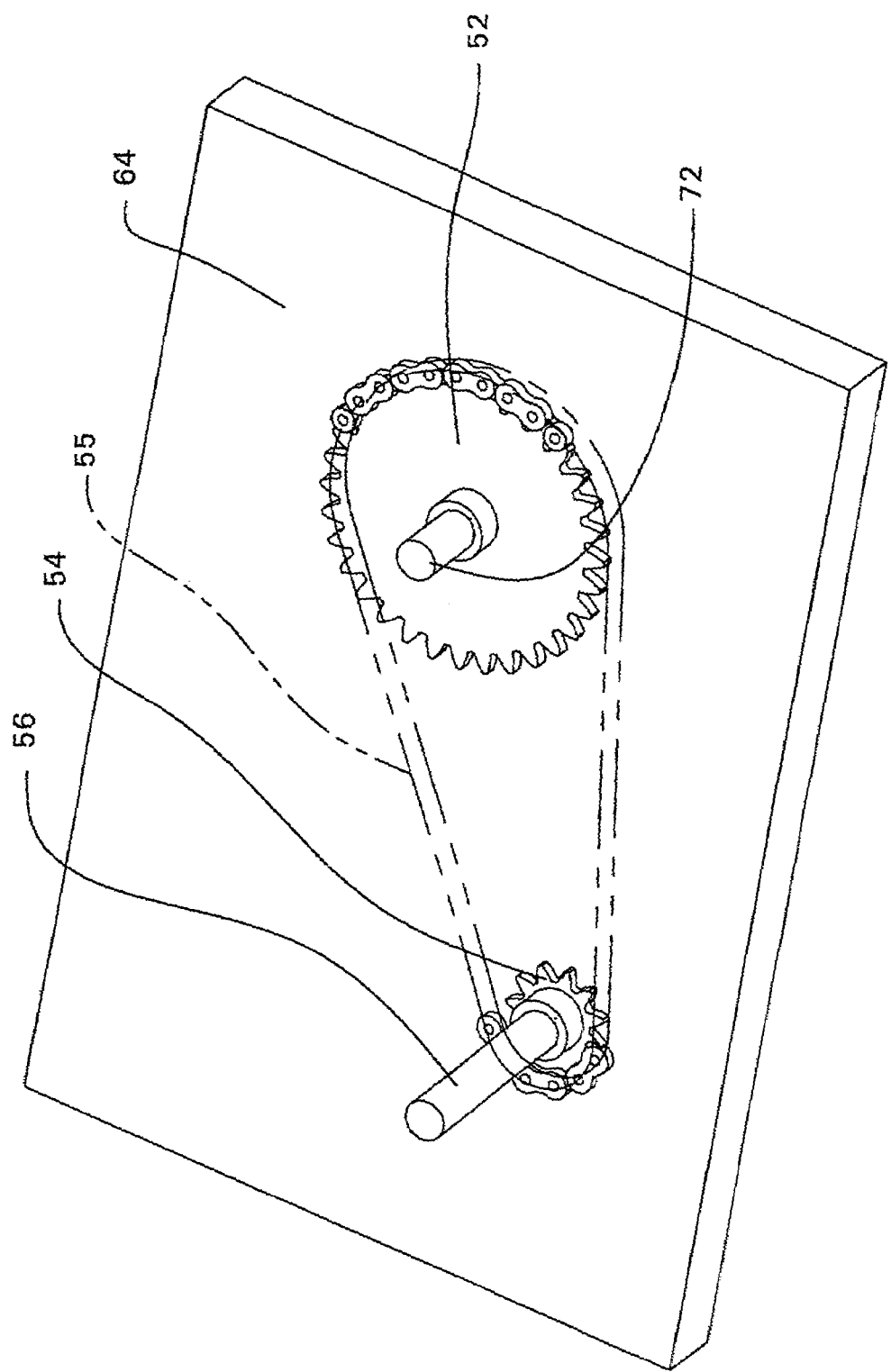
FIG. 5 shows the housing rotation gear and housing reduction gear on the plate.
Figure 17:
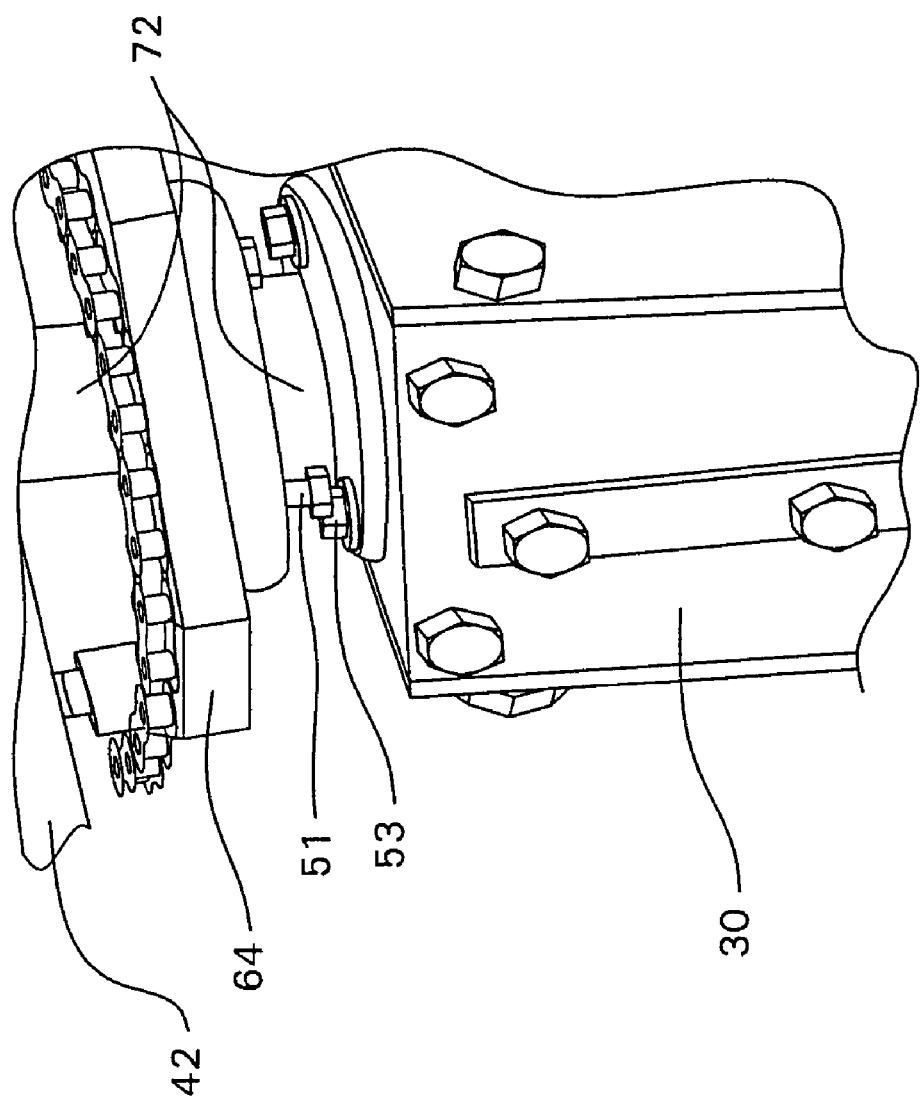
FIG. 17 shows the plate stops and the fixed stops.

As shown in FIG. 5, a rotation shaft 72 to rotate a second housing 42 relative and a plate 64 to the first housing 30 is fixedly attached to the plate 64. As shown in FIG. 2, the rotation shaft 72 is fixedly attached upwardly from said plate 64, to the second housing 42. Referring to FIG. 17, the rotation shaft 72 extends downwardly from said plate 64 and is rotatably mounted to the first housing 30. Referring to FIG. 2, a first motor 44 is attached to the second housing 42 and has a vertically disposed downward projecting drive shaft 46. A suitable motor is Model No. 601700, manufactured by Warn Works, Inc. As shown in the schematic of FIG. 4, a first gear 48-A is fixedly and concentrically disposed on the vertical drive shaft 46 near a bottom panel 50 of, and within the second housing 42. Within the second housing 42, and rotatably mounted on a top side of a second housing bottom panel 50 are the first gear 48-A, a second gear 48-B, and a fourth gear 48-D. A third gear 48-C is concentrically fixedly mounted immediately above said second gear 48-B. So the second gear 48-B and third gear 48-C rotate in unison and have the same axis of rotation. The first gear 48-A engages the second gear 48-B via a first-second chain 49-A. The ratio of the first gear 48-A to the second gear 48-B is about 1:2.2. The ratio of the second gear 48-B to the third gear 48-C is about 2.2:1. The third gear 48-C is engaged with the fourth gear 48-D via a third-fourth chain 49-C. The ratio of the third gear 48-C to the fourth gear 48-D is about 1:2.9. The fourth gear 48-D is fixedly and concentrically secured to an intermediate drive shaft 56 that extends downward through the second housing bottom panel 50.

As shown in FIG. 5, the intermediate drive shaft 56 is fixedly attached to a housing reduction gear 54. The housing reduction gear 54 is rotatably mounted on a plate 64. The plate 64 is disposed below the second housing bottom surface 50, and above the first housing top panel 40, as shown in FIG. 2.

In FIG. 5, a housing reduction chain 55 engages the housing reduction gear 54 to a housing rotation gear 52. The housing rotation gear 52 is fixedly mounted to the housing rotation shaft 72. The housing rotation shaft 72 is fixedly attached to the plate 64 and the second housing bottom panel 50. The housing rotation shaft 72 extends downwardly to be rotatably mounted on the first housing top panel 40. Thus, when the housing reduction chain 55 drives the housing rotation shaft 72, the second housing 42 and plate 64 rotate about the housing rotation shaft 72, at approximately 5 rpm, as the first housing 30 remains fixed to the mounting bracket 22 via the base 22. The second housing 42 can rotate up to 180°. As shown in FIG. 17, plate stops 51 are mounted on the bottom of the plate 64 and extend downward. The plate stops 51 prevent further rotation of the plate 64 and second housing 42 by contacting fixed stops 53.

Figure 6:
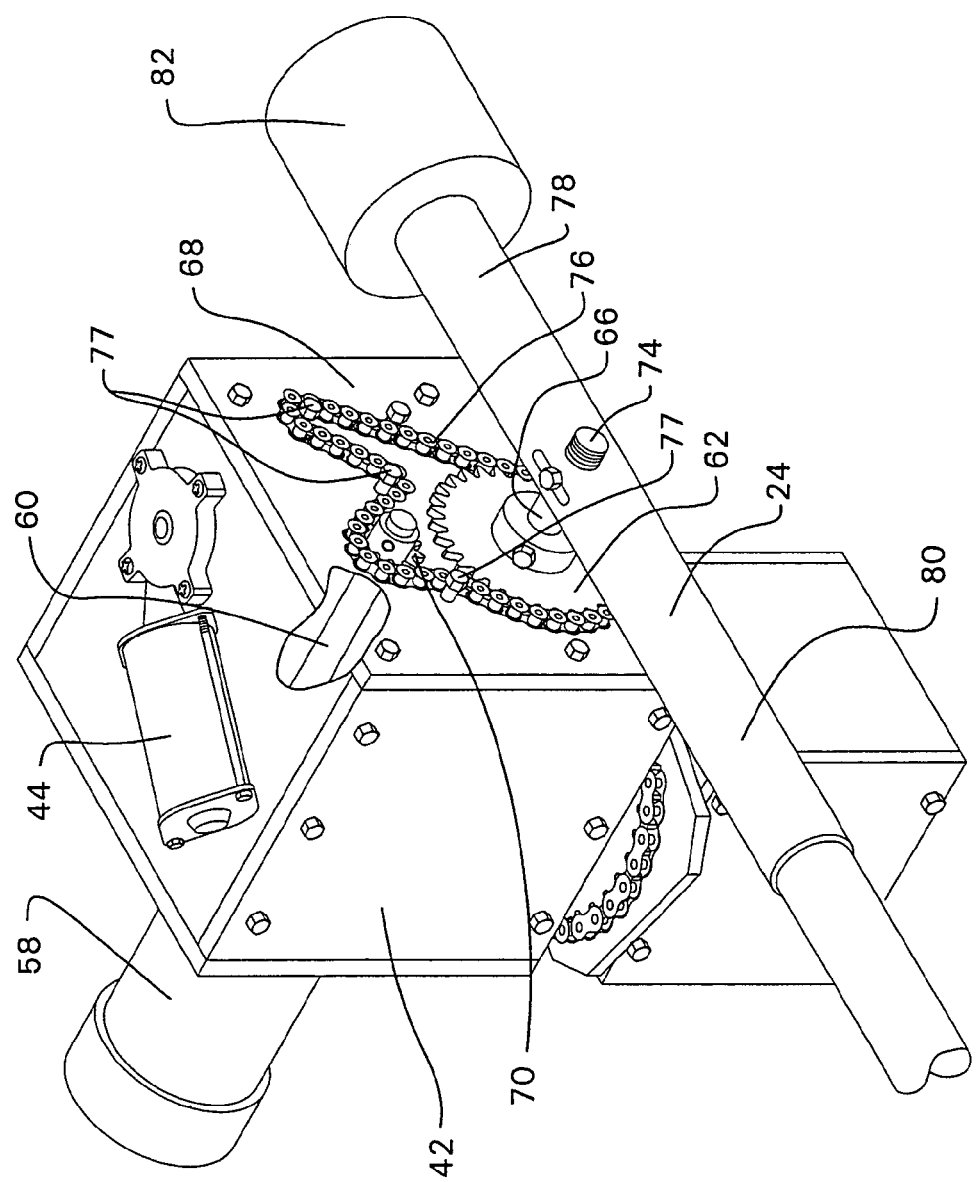
FIG. 6 is a perspective view of the second housing, the reduction gear, shaft pivot gear, pivot chain, and main shaft.

Referring to FIG. 6, a drive motor 58 is attached to the second housing 42. A suitable drive is Model No. 601700, manufactured by Warn Works, Inc. The drive motor 58 is fixedly mounted to a horizontal oriented outward directed reduction shaft 60 rotatably mounted to said second housing front panel 68. A reduction gear 70 is fixedly mounted to the reduction shaft 60. The reduction gear 70 is rotatably mounted immediately forward the front panel 68. A pivot shaft 66 rotatably mounted to said front panel 68 is fixedly mounted to a pivot gear 62. The pivot gear 62 is rotatably mounted immediately forward of the front panel 68 of the second housing 42. The pivot shaft 66 extends forward of the front panel 68. A reduction chain 76 is wrapped around a reduction gear 70 and a pivot gear 62 to transfer rotational power from the reduction gear 70 to the pivot gear 62. Thus the pivot gear 62 and shaft 66 rotate in unison. A section of the pivot shaft 66 that extends forward from the pivot gear 62 extends through and is fixedly secured to a portion of the main shaft 24 referred to as the pivot point 74. The reduction chain 76, driven by the horizontal reduction shaft 60, engages the reduction gear 70 and the horizontal pivot gear 62 to reduce the torque required to pivot the main shaft 24. Slack of the reduction chain 76 is reduced by traversing the reduction chain 76 around three chain adjustment bolts 77 that extend outwardly from the second housing front surface 68, and are substantially perpendicular thereto. The shaft pivot point 74 is disposed near a shaft first end 78, and between the shaft first end 78 and an opposed shaft second end 80. The drive motor 58 rotates the horizontal reduction shaft 60 at about 20 rpm, and rotates the pivot gear 62 at about 2 rpm.

A cylindrical counterweight 82 is concentrically mounted at the shaft first end 78. The counterweight 82 weighs about 3.6 kilograms (8 pounds). The counterweight 82 is about 12.7 cm (5 inches) long, and has a diameter of about 7.6 cm (3 inches). The length of the main shaft 24 from the shaft first end 78 to the shaft second end 80 is about 1.2 meters (4 feet). The shaft second end 80 is hollow and has an interior diameter of about 3.2 cm (1.25 inches).

Figure 7:
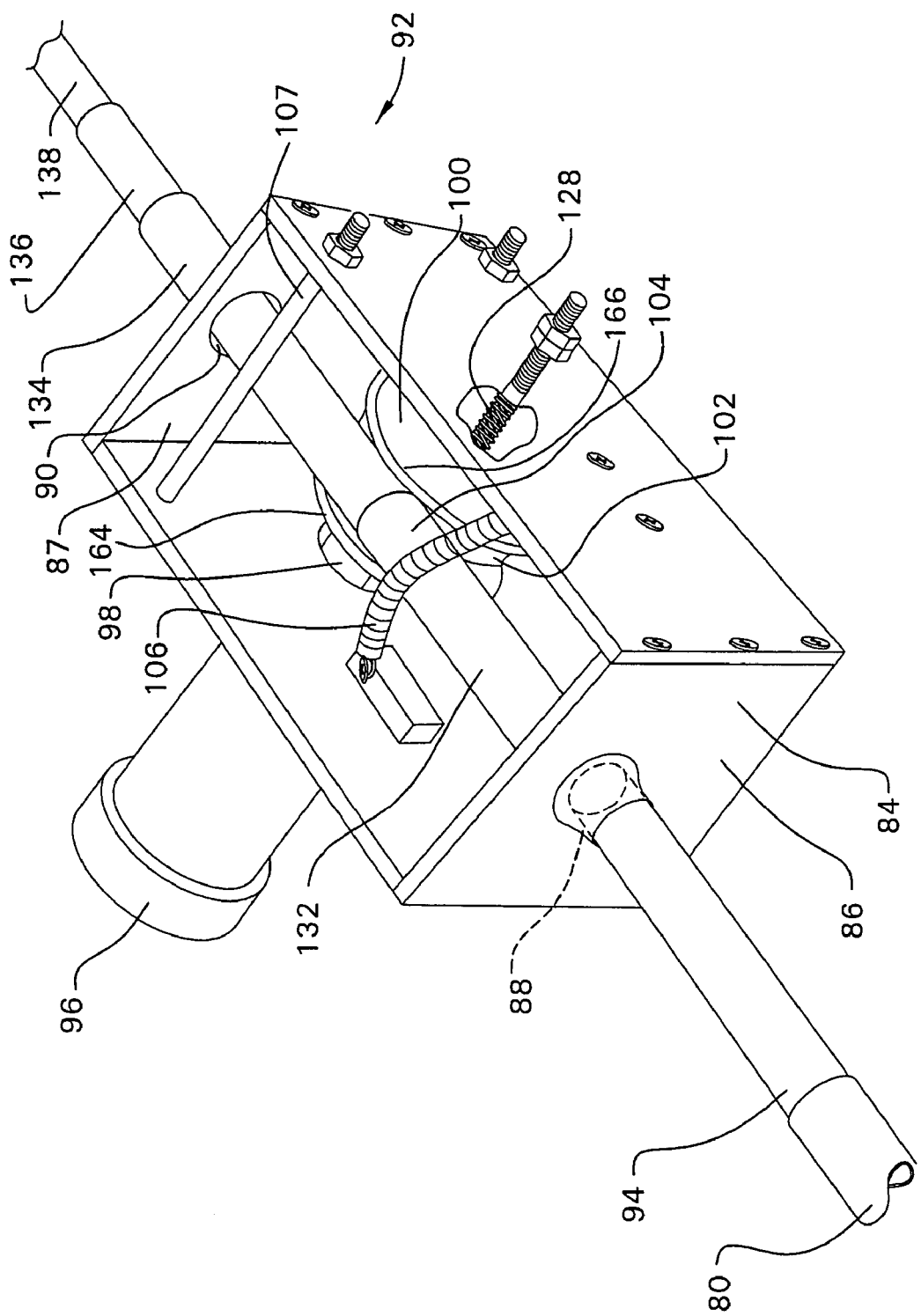
FIG. 7 shows a rectangular third housing, spool, spring, and the arm.

As shown in FIG. 7, a telescoping assembly 92 mounted within the main shaft 24 is comprised of four (4) telescopically attached arms. A first arm 132 a second 134, third 136, and fourth arm 138 each have successively reducing diameters. The first arm 132 has the largest outside diameter (about 3.2 cm (1.25 inches)). The first arm 132 has a proximal end 94 that is mounted within the shaft second end 80, and an opposed distal end 104. The second arm 134 is telescopically attached to the first arm 132. The third arm 136 is telescopically attached to the second arm 134. The fourth arm 138 is telescopically attached to the third arm 136. Thus the distal end 104 is adjacent the second arm 134 when the telescoping assembly 92 is fully extended. The first arm 132 outside diameter is about equal to the shaft second end 80 internal diameter, or about 3.2 cm (1.25 inches). The other three (3) arms 134, 136, 138 have successively reduced diameters to allow for the telescoping motion. The fourth arm has an outside diameter of about 1.9 cm (0.75 inches). In one exemplary embodiment a third drive motor 96 is attached to said extendable and retractable assembly 92 for internally extending and retracting said extendable and retractable assembly 92; and a controller 110 to control said first 44, second 58, and third 96 drives.

Referring to FIG. 7, the telescoping assembly also includes a third housing 84 attached to the first arm 132 of the assembly. The third housing 84 has two opposed short sides, a close short side 86, and a far short side 87. The close short side 86 is fixedly secured to the first arm 132 and has a first aperture 88 coaxial with the interior opening of the first arm 132. The far short side 87 of the third housing 84 has a second aperture 90 coaxial with the interior opening of the second arm 134, which allows the second 134, third 136, and fourth 138 arms to extend and retract through the second aperture 90.

A third drive motor 96 is mounted on the outside of the third housing 84. The third drive motor 96 rotates a substantially horizontally disposed third drive shaft 98 at about 300 rpm. The third drive shaft 98 is rotatably mounted within the third housing 84. A suitable motor is Model No. HP24, manufactured by Ryobi Technologies, Inc.

As shown in FIG. 7, a spool 100 with a rotational axis coaxial with said third drive shaft 98 has a fixed half 164 that is fixedly attached to the third drive shaft 98 within the third housing 84 between the first aperture 88 and the second aperture 90. The spool 100 also has a translationally moveable half 166, which is not fixedly attached to the third drive shaft 98, but is rotationally secured to said fixed half 164, permitting the moveable half 166 to bias towards and away from said fixed half 164 along the direction of the rotational axis by a compression spring 128, which will be discussed below. One means for rotationally securing the spool halves 164, 166 comprises a pin-bore arrangement inside each spool half 164, 166. For example the fixed half 164 comprises at least two bores extending substantially parallel to the spool's axis of rotation adapted for receiving pins fixed to the moveable half 166. This prevents one half 164, 166 from rotating relative to the other half 166, 164, while allowing the moveable half 166 to bias with the fixed half 164 in a direction parallel to the spool's axis of rotation. Any similar rotational securing arrangement may also be used.

Further, the spool 100 defines a u-shaped groove 102 about its perimeter for receiving the second 134, third 136, and fourth 138 arms. The portion of the spool 100 that defines a u-shaped groove 102 is made of a soft rubber, so it can grip the telescoping arms. The depth of the u-shaped groove 102 is about 1.5 cm (0.59 inches). A spool compression spring 128 is coaxially and surroundingly mounted on the outside of the third drive shaft 98 having one end contacting one half of the translationally moveable half 166 of the spool 100, and the other end contacting the third housing 84 to bias the moveable half 166 towards the fixed half 164. Therefore the width of the u-shaped groove 102 adapts to the diameter of the second 134, third 136, and fourth 138 arm. Thus the spool 100 applies compressive force to frictionally engage the second 134, third 136, and fourth 138 arm. The center point of the u-shaped groove 102 is aligned with the center points of the first and second apertures 88, 90, as well as the longitudinal axis of the telescoping assembly 92. The longitudinal axis of the main shaft 24 coincides with the longitudinal axis of the telescoping assembly 92. Thus, when the spool 100 rotates, it extends and retracts the second 134, third 136, and fourth 138 arm through the second aperture 90.

As shown in FIG. 7, a spring 106 is disposed transverse to and in contact with the first arm distal end 104. The spring 106 has two opposed ends that are secured to the long sides 87 of the rectangular third housing 84 to bias second 134, third 136, and fourth 138 arm toward the rotational axis of the spool 100 and within the u-shaped groove 102. This prevents the second 134, third 136, and fourth 138 arm from falling out of the u-shaped groove 102, and improves frictional engagement of the spool 100 and the second 134, third 136, or fourth 138 arm.

FIG. 7 also shows a transverse securing member 107 fixedly attached to the long sides 87 of the rectangular third housing 84, disposed substantially perpendicular to, and immediately above the telescoping assembly 92 to limit any vertical movement and shaking of the telescoping assembly 92.

The second 134, third 136, and fourth 138 arm can retract to be entirely disposed within the first arm 132. Or, the telescoping assembly 92 can extend to about 4 meters (13 feet) from the proximal end 94. Thus, when fully extended, the entire length of the extendable arm 20, from the shaft first end 78 to the free end 140 of the fourth arm 138 is about 5.2 meters (17 feet).

The vertical drive shaft 46 drive motor 44, the horizontal reduction shaft 60 drive motor 58, and the third drive motor 96 obtain energy from the vehicle's 12 volt battery. In a further embodiment, the energy source is a generator.

Figure 8:
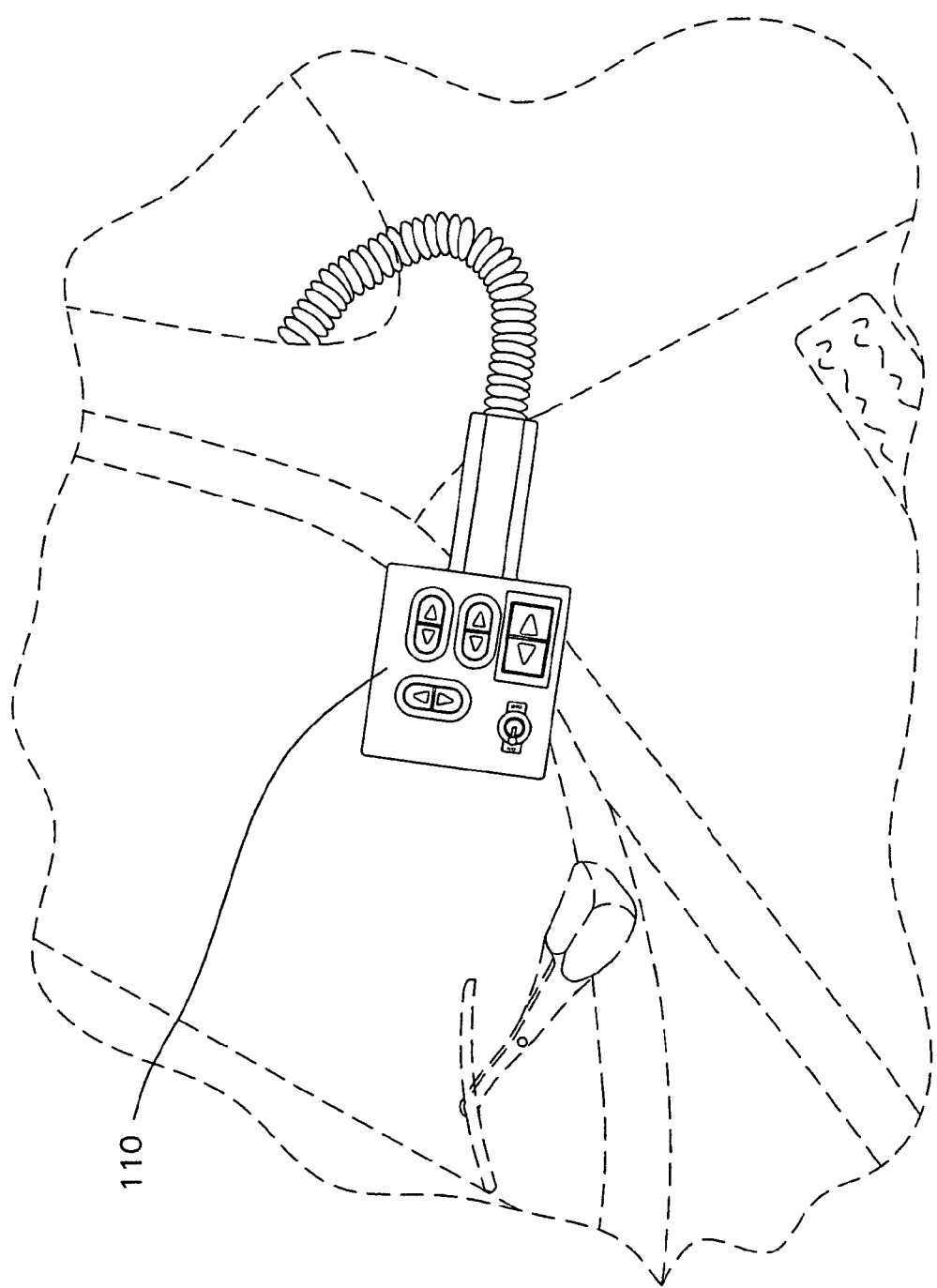
FIG. 8 shows the controller.

Referring to FIG. 8, a controller 110 is connected to and powered by the vehicle's 12-volt battery. The controller 110 has one master on-off switch, and three other directional switches to independently actuate the vertical drive motor 44, the drive motor 58, or the third drive motor 96, respectively. The directional switches select the direction of rotation of the respective motors. The controller 110 can be operated from within the passenger compartment of the vehicle, or from outside the vehicle.

Various accessories 108 can be mounted at the fourth arm 138 free end 140. These accessories 108 include a light, communications equipment, detection and identification equipment, document transfer equipment or weapons delivery systems. Further, a directional motor can be attached to the free end 140 of the telescoping assembly, and to the accessory 108 for controlling the direction of certain accessories. For example, the directional motor can direct a video camera to view or record the front seat, or re-direct the camera to view or record the rear seat.

Figure 10A:
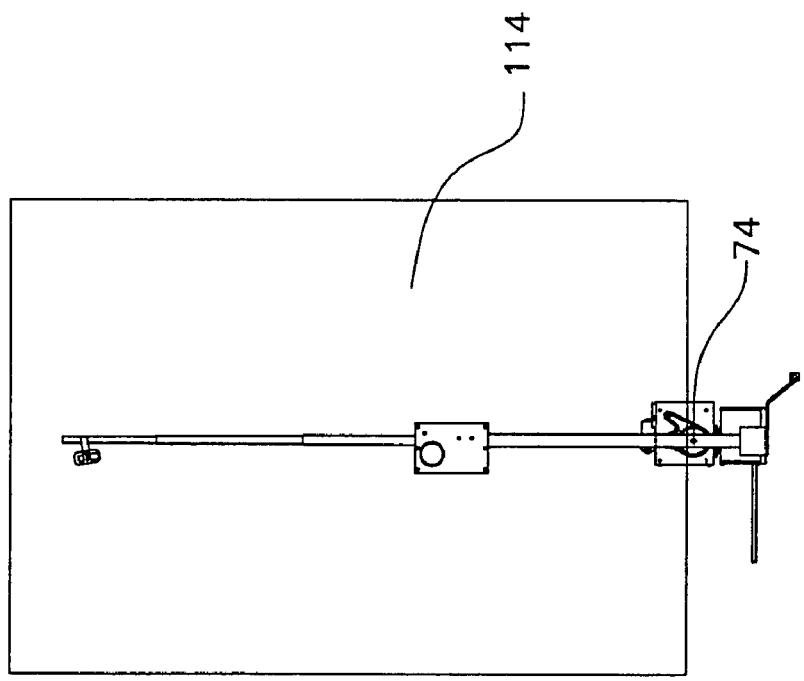
FIG. 10 shows the first pivotal plane, and the second pivotal plane at 10A.
Figure 10:
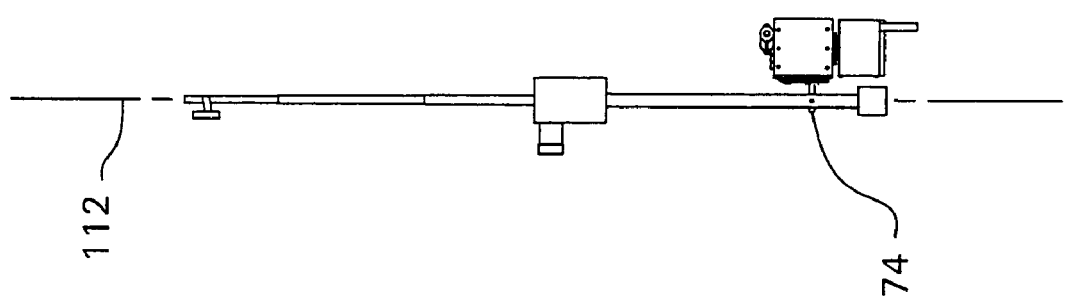

In operation, beginning from the stowed position as shown in FIG. 3, the officer actuates the controller's 110 switch for the drive motor 58 to raise the main shaft 24, as shown in FIG. 6. The drive motor 58 drives the horizontal reduction shaft 60. The horizontal reduction shaft 60 rotates the reduction gear 70 to engage the reduction chain 76, and thus the horizontal pivot gear 62. The horizontal pivot gear 62 is fixedly attached to the pivot shaft 66, to raise the main shaft second end 80 away from the support bracket 36. Here, the main shaft 24 pivots in a first pivotal plane 112, as shown in FIG. 10. The officer turns the switch off when the main shaft 24 is standing vertical.

Next, the officer turns on the switch for the vertical drive motor 44, until second housing 42 has rotated about −90°, or 90° counterclockwise when viewed from above. Now, with the main shaft 24 in the second pivotal plane 114, the officer again actuates the drive motor 58 to pivot the main shaft 24 towards the driver.

Then, the officer turns on the switch for the third drive motor 96 to rotate the spool 100 to extend the free end 140 of the fourth arm 138 until it is fully extending from the third arm 136. Then the spool 100 engages and extends the third arm 136. The third arm 136 has a greater diameter than the fourth arm 138. Thus a first half of the spool 100 is pushed away from the other, yet still frictionally engaged because the compression spring 128 biases the moveable half 166 towards the fixed half 164 of the spool 100. So the u-shaped groove 102 widens to adapt to the larger diameter. After engagement of the third arm 136, the spool 100 likewise engages and extends the second arm 134 until it is extended from the first arm 132. Here, with the appropriate accessory 108 adjacent the driver, the officer can communicate with the driver. The accessory 108 can be a two-way radio, and a container so the driver can deposit a driver's license and proof of insurance. The officer then retracts the telescoping assembly 92 by actuating the spool 100 to rotate in the opposite direction. For example the second arm 134 is retracted until the spool 100 engages the smaller diameter third arm 136. Once the spool 100 has retracted the second arm 134, and the spool encounters the third arm 136, the spool compression spring 128 will bias the moveable half 166 towards the fixed half 164. The u-shaped groove 102 will maintain frictional engagement with the second 134, third 136, and fourth 138 arms in this same manner.

Figure 9:
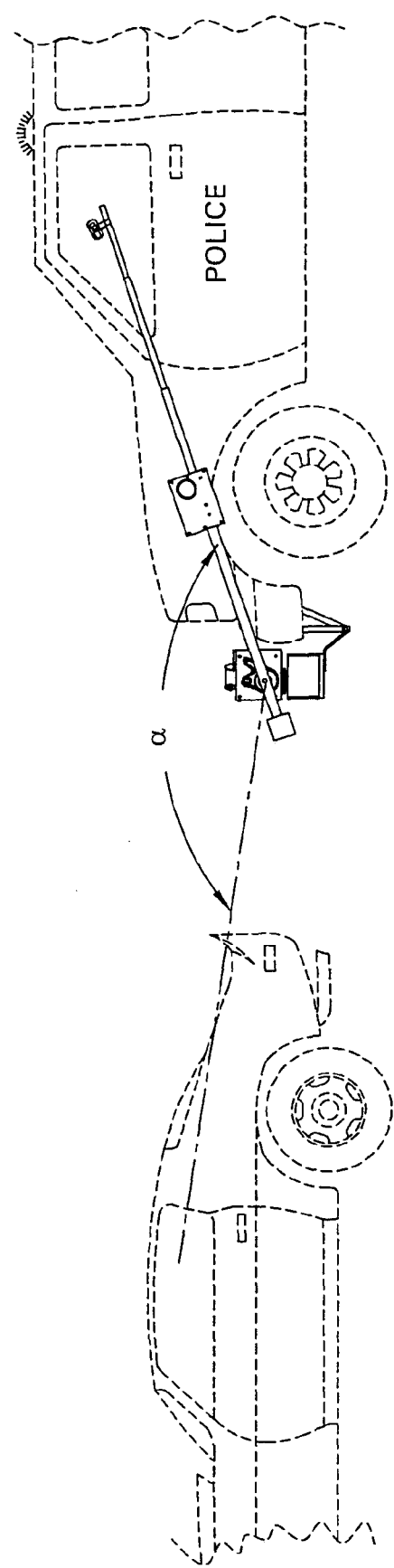
FIG. 9 shows a side view of a typical pivot angle between the a pulled over driver and police vehicle.

Then the officer actuates the drive motor 58 to pivot the main shaft 24 toward the officer's window to view the driver's license and proof of insurance, as shown in FIG. 9. In this example the angle of rotation, designated as α, is about 140° to 160°. The free end 140 can be retracted or extended if necessary. To return the driver's license and proof of insurance to the driver, the drive motor 58 is again actuated to pivot the main shaft 24. And the third drive motor 96 is actuated to rotate the spool 100 to extend the free end 140 and the accessory 108 towards the driver.

After the officer returns the documents to the driver, the officer actuates the drive motor 58 to move the main shaft 24 away from the driver. One method is to orient the main shaft 24 so it is substantially vertical, as shown in FIG. 10. Next, the vertical drive motor 44 is actuated to rotate the second housing 42 about 90° clockwise, as viewed from the top. Now, the main shaft 24 is again in the first pivot plane 112, and the drive motor 58 is actuated to lower the main shaft 24 onto the resting arm 36.

The extendable arm 20 length, when the telescoping assembly 92 is fully retracted within the main shaft 24, should not be longer than the distance from the shaft first end 78 to the window of the police officer. Otherwise, the free end 140, and the accessory 108 would extend beyond the window of the police officer.

The extendable arm and mounting bracket weighs about twenty seven (27) kilograms (sixty (60) pounds). An extendable arm with less weight is suggested in a further embodiment. This can be accomplished by use of components of lightweight materials. Such as non-metal materials, including but not limited to, plastics, composites, and ceramics.

Figure 12:
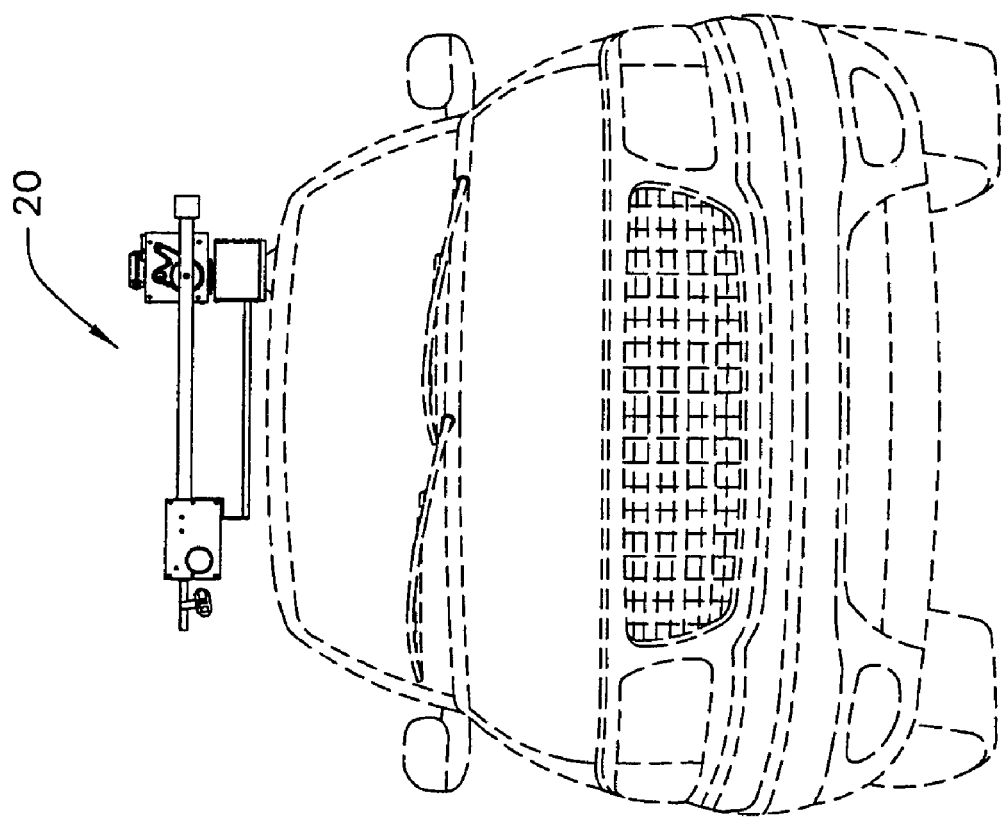
FIG. 12 shows the further embodiment of the extendable arm as mounted on the roof of the vehicle.

The extendable arm 20 can extend to various lengths, depending on the selected materials used, diameters and dimensions of components, and the placement of the extendable arm 20 on the vehicle. If the extendable arm 20 is placed near the front bumper, a maximum length of about 5.2 meters (17 feet) is adequate. A longer extendable arm 20 may be desired if the extendable arm 20 is mounted near the middle or rear of the vehicle. FIG. 12 shows the extendable arm 20 mounted on the roof of the vehicle.

In a further embodiment, the controller 110 not only controls the positioning, but also the velocity, and acceleration of the extendable arm 20. In this embodiment the controller 110 can also control the extension and retraction velocity, and acceleration of free end 140 by controlling the angular velocity and acceleration of the spool 100. A controller 110' can have joystick control and be attached to the dashboard, as shown in FIG. 16.

Figure 16A:
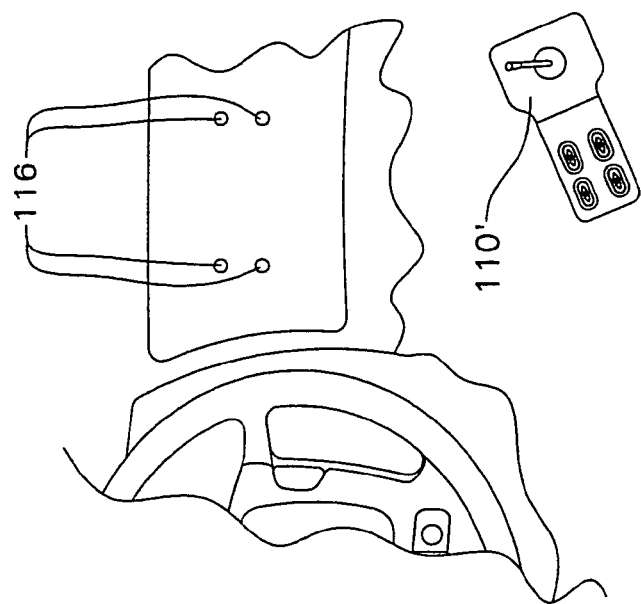
FIG. 16A shows the controller detached from the dashboard.
Figure 16:
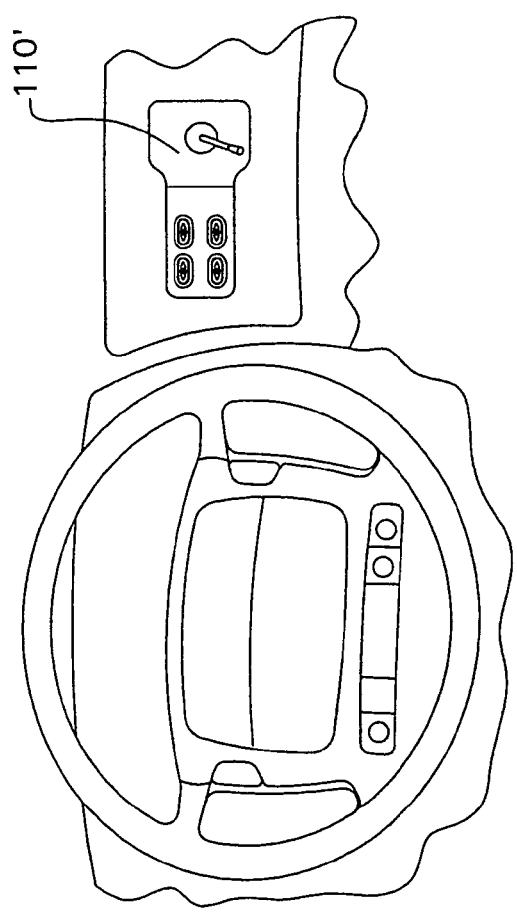
FIG. 16 shows a controller housed in the dashboard.

The controller 110' can also be removed from the dashboard and any connecting wiring, for remote operation, as shown in FIG. 16A. The controller 110, 110' can be rechargeable via electrical connectors 116. The controller 110, 110' can be used from inside the vehicle, or outside of the police vehicle. The extendable arm 20 can also be controlled from a distantly remote location, such as from a satellite, helicopter, or police station.

Figure 14A:
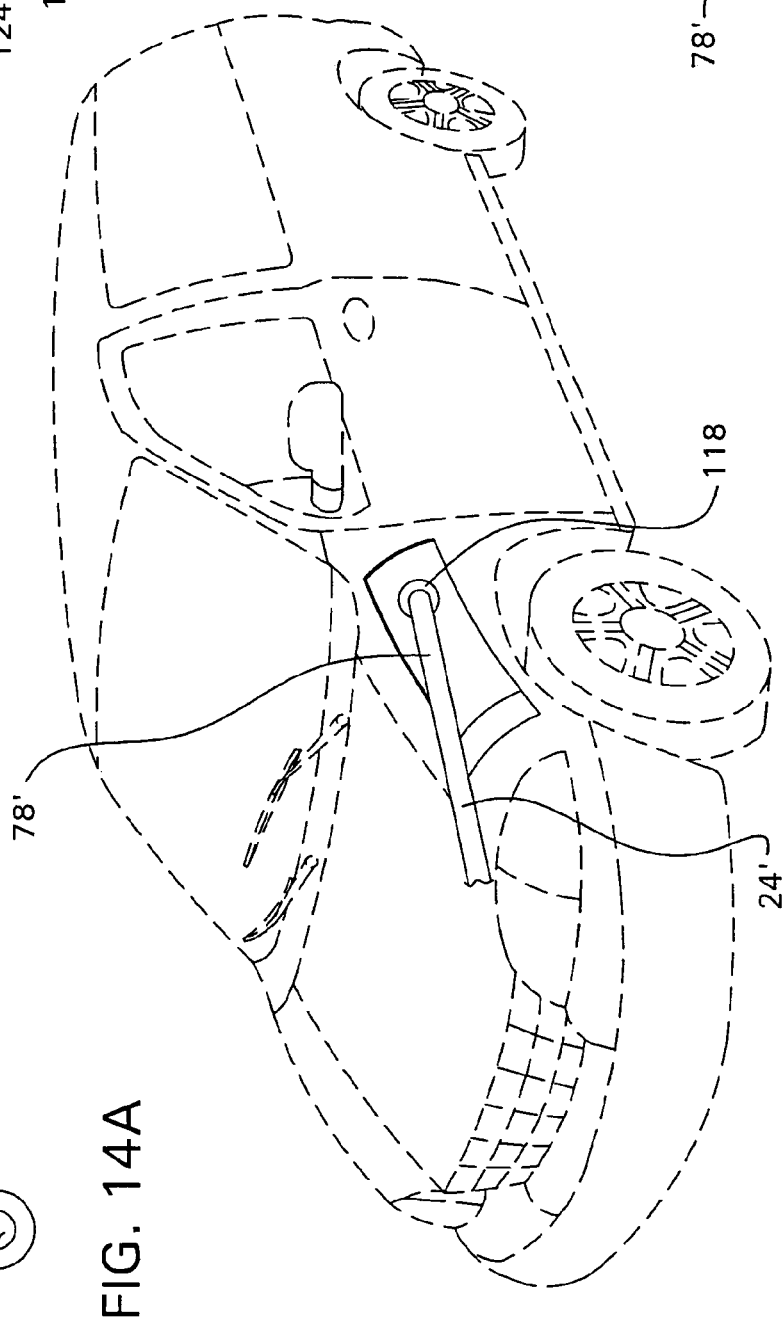
FIG. 14 shows the extendable arm mounted within the vehicle body. This also shows the first end of the shaft having a ball-in-socket configuration at FIGS. 14-A and 14-B.
Figure 14B:
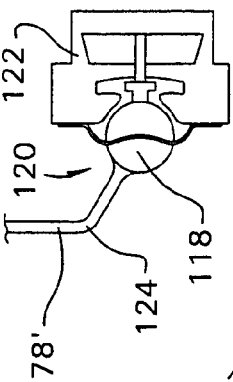
Figure 14C:
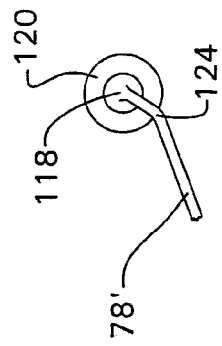
Figure 14:
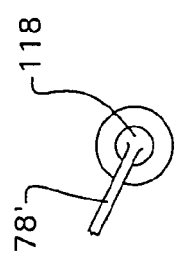

In a further embodiment, the controller 110' comprises a joystick control for use when the main shaft first end 78' has a ball portion 118 for a ball-in-socket joint 120, as shown in FIGS. 14, 14-A, 14-B, and 14-C. This embodiment includes a universal pivoting motor 122 (FIG. 14-C) to control the angular X-Y-Z positioning of the ball portion 118 of the ball-in-socket joint 120, on which the main shaft first end 78' would be fixedly connected. Thus allowing three degrees of freedom for the main shaft 24'. FIGS. 14-B and 14-C show a main shaft first end 78' having a bent leg 124 to allow for pivoting the main shaft 24' outside the vehicle body when the ball-in-socket joint 120 remains within or adjacent the vehicle body.

The controller 110, 110' can also enable the extendable arm 20 to have pre-programmed placement positions. This would allow the free end 140 to move adjacent to a window, or any other location with the touch of one control. The controller 110, 110' can also have a switch that controls a directional motor attached at the free end 140 to aim an accessory 108 to selected positions. The controller 110, 110' can also have a video screen to monitor output from a video camera, or display breathalyzer results.

Figure 11:
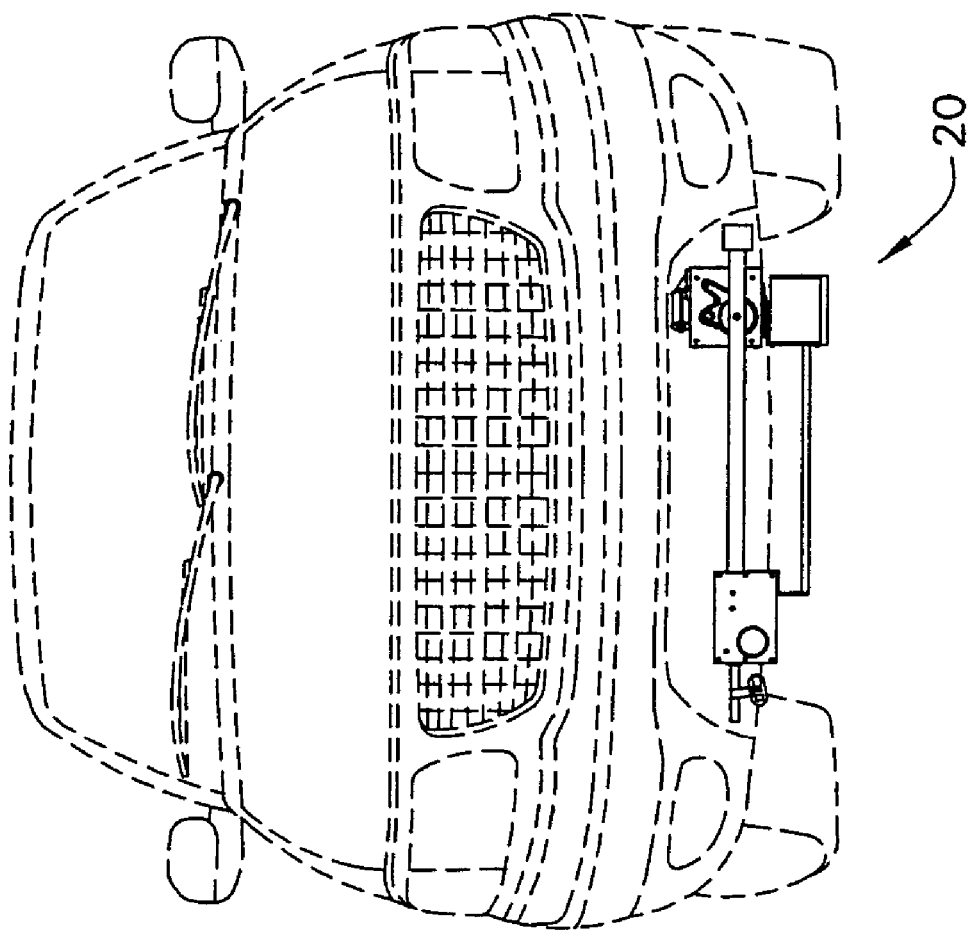
FIG. 11 shows a further embodiment of the extendable arm as mounted under the front bumper.
Figure 13:
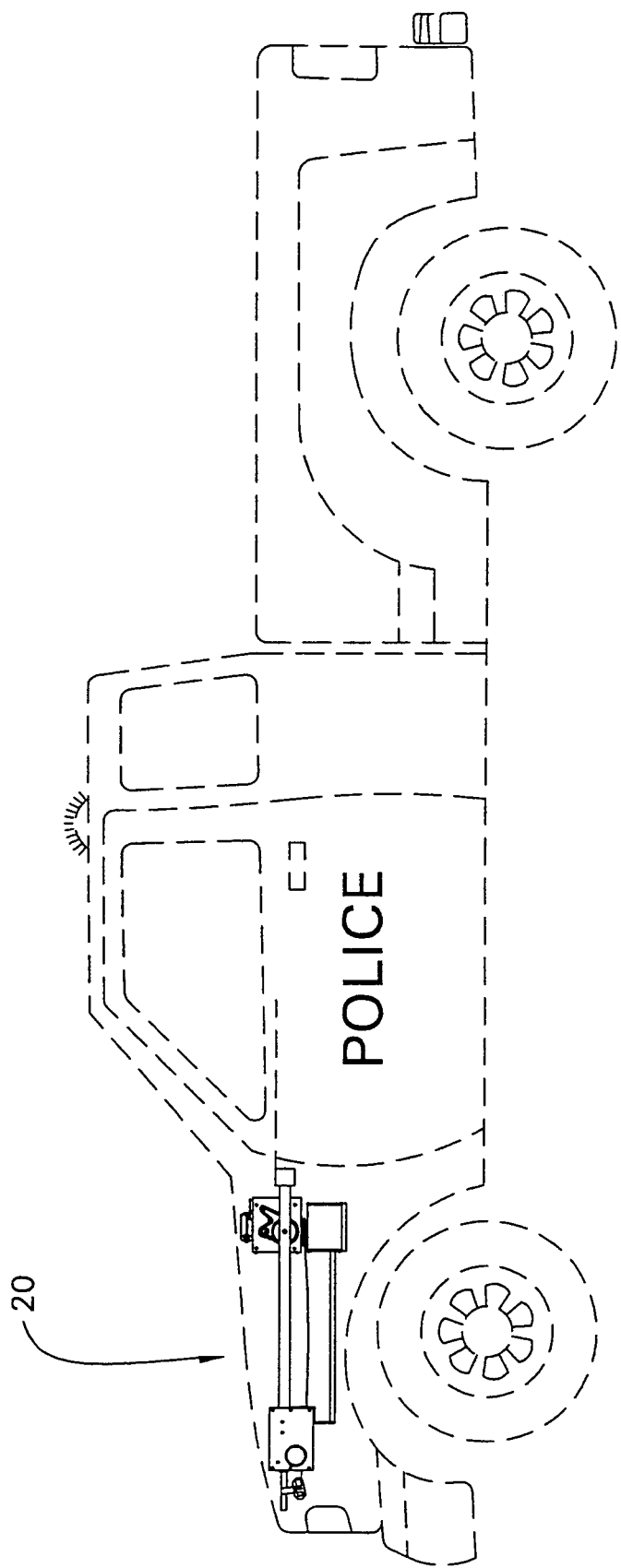
FIG. 13 shows the extendable arm as mounted on the front driver's side quarter panel.

FIG. 11 shows a further embodiment of the extendable arm 20 stowed position underneath the front bumper. FIG. 12 shows the stowed position to be on the roof of the car. FIG. 13 shows the extendable arm 20 mounted between a front bumper and hood. This location may be desirable to not compromise ground clearance and height clearance.

FIG. 14 shows the extendable arm 20 having a stowed position in the vehicle body. This embodiment includes an extendable arm 20 that is concealed within the vehicle body near, for example, a front quarter panel. A sliding or otherwise openable door 150 allows the main shaft 24' to extend from within the vehicle. The main shaft first end 78' can remain within the vehicle. Or, the main shaft first end 78' can be deployed outside of the vehicle by a deployment carriage 160, as shown in FIG. 15.

Figure 15:
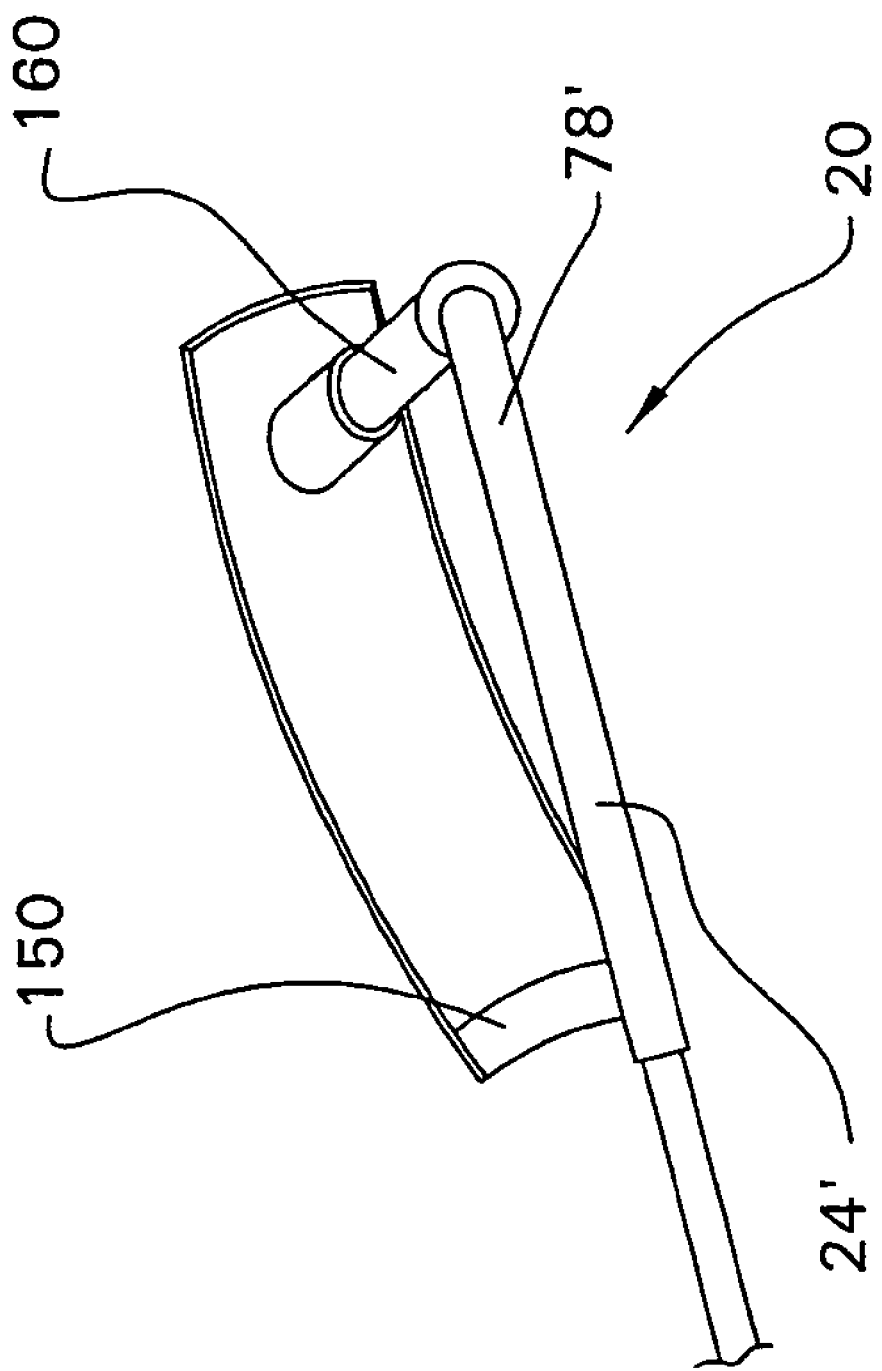
FIG. 15 shows the extendable arm deployed from within the vehicle.

Although FIGS. 14 and 15 show a deployable extendable arm 20 having a ball-in-socket joint 120, the embodiment having the vertical drive motor 44, drive motor 58, and third drive motor 96, can also be deployably mounted within the vehicle.

The telescoping assembly 92 can be mounted within the main shaft 24, as described above, or as a unitary extension of the main shaft 24 to extend and retract the free end 140.

Said telescoping assembly 92 and said main shaft 24 may be solid, or hollow. The hollow portion could be used for the facilitation of receiving breathalyzer samples, which would keep the breathalyzer device away from the driver.

A further embodiment includes a telescoping assembly 92 that uses a change in fluid pressure to extend and retract the free end 140, rather than a third drive 96. Alternatively, an accordion-type arm can extend and retract the free end, rather than a telescoping assembly.

Said telescoping assembly 92 and said main shaft 24 may be comprised of any cross-sectional shape such as circular, square, hexagonal, triangular, or rectangular. A non-circular cross-sectional shape may be desired to reduce torsional deflection or twisting.

The positional acceleration and velocity of the main shaft 24 can vary depending on the materials used and the size of the components. In one embodiment, the velocity slows to a stop as the free end 140 approaches its final destination, such as the adjacent the officer's window.

In addition to the electrical motors described, the invention may use other types of power mechanisms, such as pneumatic or hydraulic motors for the first 44, second 58, or third drives 96.

The extendable arm 20 can be removed by conventional quick disconnect features, whereby the mounting bracket 22 would remain on the vehicle for reattachment. The extendable arm 20 can be installed on virtually any vehicle.

Another construction of the telescoping assembly 92 includes the omission of the first housing 30 and base 32, whereby the second housing 42 is directly attached to the mounting bracket second part 28.

The accessories 108 that can be attached to the free end 140 include, communication equipment includes a two-way audio-visual communication and recording system, a screen to display captions for hearing impaired drivers or to display a translated language for a driver who does not speak the same language as the officer.

Detection and identification systems can be mounted at the free end 140. Such as a retina scan, or fingerprint systems. Sensors that detect the presence of chemicals such as alcohol, illegal drugs, gun powder, bio-hazards, metal, or contraband can also be employed.

Systems for the transfer of documents can also be mounted at the free end 140. These include clips or containers.

The free end 140 can further be used to support a member capable of immobilizing the vehicle's occupants.

In one embodiment, the accessory 108 obtains energy from the accessory's 108 battery. In a further embodiment, the accessory 108 obtains energy from the vehicle battery or from a generator.

In a further embodiment, all gears and chains i.e. pivot gear 62, reduction gear 70, reduction chain 76, are disposed within a housing, such as the second housing 42.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. An extendable arm for a motor vehicle comprising: a main shaft moveably attached to the motor vehicle via a mounting bracket, said main shaft having first and second opposed ends, said first end being attached to the motor vehicle and said main shaft having a stowed position, said main shaft second end is positioned adjacent the motor vehicle and said main shaft first end is pivotally attached to the motor vehicle so that a horizontal and vertical orientation of said main shaft can be selectively set; an extendable and retractable assembly mounted within said second end; said extendable and retractable assembly adapted to extend and retract, so that a free end of said extendable and retractable assembly can be selectively extended away from or retracted towards said main shaft second end a first drive attached to said main shaft for setting said horizontal orientation; a second drive attached to said main shaft for setting said vertical orientation; a third drive attached to said extendable and retractable assembly for internally extending and retracting said extendable and retractable assembly; and a controller to control said first, second and third drives, said mounting bracket having a mounting bracket first part that is secured to a vehicle frame and disposed near the front bumper.

2. The extendable arm according to claim 1, further comprising: said free end adapted to receive an accessory thereon, said accessory comprising one or more of the following, retina scanner; fingerprint system; sensor that detects the presence of chemicals such as alcohol, illegal drugs, gun powder, bio-hazards, metal, nuclear material; containers for the transfer of documents; clips; nozzles to discharge immobilizing gas, two-way audio-visual camera; two-way microphone-speaker system.

3. An extendable arm according to claim 1, further comprising: an openable door integral with the body of the motor vehicle; a deployment carriage having a fixed end attached to the vehicle frame, and a moveable end attached to said main shaft first end, whereby said moveable end can move to be disposed outside and inside the vehicle body, wherein when inside the body, said openable door can close to confine the extendable arm inside the body.

4. An extendable arm according to claim 1, further comprising: said extendable and retractable assembly being a telescoping assembly.

5. An extendable arm according to claim 4, further comprising: said mounting bracket disposed near the driver's side of the front bumper; a rod extending substantially horizontally from said mounting bracket terminating at a support point near the passengers side of the front bumper; and a support bracket extending upwardly from said rod support point, said support bracket having a forward extending finger and an upward extending tip whereby said main shaft rests on said support bracket when not in use.

6. An extendable arm according to claim 1, further comprising: said controller having programmable features to move said free end to a position defined by pre-selected coordinates.

7. An extendable arm according to claim 1, further comprising: the extendable arm responsive to a controller from a distantly remote location.

8. An extendable arm for the outside of a motor vehicle comprising: a mounting bracket configured to be attached to the outside of the motor vehicle; a main shaft having first and second opposed ends, said first end being attached to said bracket and said main shaft having a stowed position, in which said main shaft second end is positioned adjacent the motor vehicle so that said main shaft second end can be horizontally pivoted away from the motor vehicle and a vertical orientation of said main shaft selectively set; a first drive attached to said main shaft for selectively horizontally pivoting said main shaft; a second drive attached to said main shaft for selectively setting the vertical orientation of said main shaft: a telescoping assembly mounted within said main shaft; said telescoping assembly adapted to internally extendably and retractably telescope, so that a free end of said telescoping assembly can be selectively extended away from or retracted towards said main shaft second end; a third drive attached to said telescoping assembly for selectively extending and retracting said telescoping assembly; and a controller for controlling said first, second, and third drives;

said mounting bracket has a first end attached to the motor vehicle, and a second end disposed away from the motor vehicle; a base attached said mounting bracket second end; a first housing is fixedly attached to, and immediately above said base; a rotation shaft is rotatably mounted to said first housing, and extends upwardly therefrom in a substantially vertical direction to be fixedly attached to a plate, and upwardly therefrom fixedly attached to a bottom panel of a second housing, said second housing having a front panel; said rotation shaft is fixedly attached to said second drive, whereby said second drive rotates said second housing and said plate simultaneously, and whereby said first housing does not rotate because it is fixedly attached to said base a reduction shaft is fixedly attached to said first drive, said reduction shaft extending substantially horizontally away from said first drive through said second housing to a reduction gear rotatably mounted immediately forward of said front panel; a substantially horizontally oriented pivot shaft is fixedly mounted to a pivot gear rotatably mounted immediately forward of said front panel, said pivot shaft extending forwardly and fixedly secured to said main shaft; a reduction chain engages said reduction gear and said pivot gear; said telescoping assembly has a first arm, a second arm, a third arm, and a fourth arm; said first arm is secured within said main shaft; said second arm is telescopically attached to said first arm; said third arm is telescopically attached to said second arm; said fourth arm is telescopically attached to said third arm; a third housing is fixedly and concentrically attached to said first arm; a third drive attached to said third housing and fixedly attached to a third drive shaft, said drive shaft fixedly attached to a spool, said spool rotatably mounted within said third housing; and said spool has a u-shaped groove about its perimeter, said u-shaped groove having a center point coaxial with a center point of the telescoping assembly, and said spool is adapted to receive said second, third and fourth arm, whereby the actuation of said third drive engages said spool to extend or retract said second, third and fourth arms.

9. An extendable arm according to claim 8, further comprising: said mounting bracket first end attached to the motor vehicle via a utility frame, said utility frame attached to said vehicle frame under the front bumper.

10. An extendable arm for the outside of a motor vehicle comprising: a mounting bracket configured to be attached to the outside of the motor vehicle; a main shaft having first and second opposed ends, said first end being attached to said bracket and said main shaft having a stowed position, in which said main shaft second end is positioned adjacent the motor vehicle so that said main shaft second end can be horizontally pivoted away from the motor vehicle and a vertical orientation of said main shaft selectively set; a first drive attached to said main shaft for selectively horizontally pivoting said main shaft; a second drive attached to said main shaft for selectively setting the vertical orientation of said main shaft, a telescoping assembly mounted within said main shaft; said telescoping assembly adapted to internally extendably and retractably telescope, so that a free end of said telescoping assembly can be selectively extended away from or retracted towards said main shaft second end; a third drive attached to said telescoping assembly for selectively extending and retracting said telescoping assembly; and a controller for controlling said first, second, and third drives;

said mounting bracket has a first end attached to the motor vehicle, and a second end disposed away from the motor vehicle; a base attached said mounting bracket second end; a first housing is fixedly attached to, and immediately above said base; a rotation shaft is rotatably mounted to said first housing, and extends upwardly therefrom in a substantially vertical direction to be fixedly attached to a plate, and upwardly therefrom fixedly attached to a bottom panel of a second housing, said second housing having a front panel; said rotation shaft is fixedly attached to said second drive, whereby said second drive rotates said second housing and said plate simultaneously, and whereby said first housing does not rotate because it is fixedly attached to said base; a reduction shaft is fixedly attached to said first drive, said reduction shaft extending substantially horizontally away from said first drive through said second housing to a reduction gear rotatably mounted immediately forward of said front panel; a substantially horizontally oriented pivot shaft is fixedly mounted to a pivot gear rotatably mounted immediately forward of said front panel, said pivot shaft extending forwardly and fixedly secured to said main shaft; a reduction chain engages said reduction gear and said pivot gear; said telescoping assembly has a first arm, a second arm, a third arm, and a fourth arm; said first arm is secured within said main shaft; said second arm is telescopically attached to said first arm; said third arm is telescopically attached to said second arm; said fourth arm is telescopically attached to said third arm; a third housing is fixedly and concentrically attached to said first arm; a third drive attached to said third housing and fixedly attached to a third drive shaft, said drive shaft fixedly attached to a spool, said spool rotatably mounted within said third housing; and said spool has a u-shaped groove about its perimeter, said u-shaped groove having a center point coaxial with a center point of the telescoping assembly, and said spool is adapted to receive said second, third and fourth arm, whereby the actuation of said third drive engages said spool to extend or retract said second, third and fourth arms said first drive fixedly attached to a downward projecting drive shaft; said downward projecting drive shaft extending downward to be fixedly attached to a first gear rotatably mounted on a top side of said bottom panel of said second housing; said first gear engaging with a second gear via a first-second chain, said second gear rotatably mounted on said top side of said bottom panel; a third gear fixedly mounted concentric with and immediately above said second gear; said third gear engaging with a fourth gear via a third-fourth chain, said fourth gear rotatably mounted on said top side of said bottom panel; an intermediate drive shaft is concentrically fixedly attached to said fourth gear, said intermediate drive shaft extends downwardly through said second housing bottom panel to be fixedly attached to a housing reduction gear rotatably mounted to a plate; a housing rotation shaft fixedly mounted to said plate, and upwardly therefrom fixedly attached to said second housing, said housing rotation shaft extending downwardly from said plate and is rotatably mounted to said first housing; a housing rotation gear fixedly mounted to said housing rotation shaft immediately upwardly from said plate; and a reduction chain wrapped around said housing reduction gear and said housing rotation gear, whereby said housing reduction gear and said housing rotation gear rotate in unison to rotate said plate and said second housing relative to said first housing.

11. An extendable arm according to claim 10, further comprising: said spool comprising a fixed half fixed to said third drive shaft and a moveable half that biases towards and away from said fixed half in the direction parallel to the third drive shaft's rotational axis, each of said halves divided substantially equally along the spool's plane of rotation; and a compression spring concentrically surroundingly mounted on said third drive shaft, said compression spring having one end contacting said moveable half of said spool, and the other end contacting said third housing to bias said moveable half towards said fixed half.

12. An extendable arm according to claim 10, further comprising: a rigid transverse securing member disposed substantially perpendicular to the longitudinal axis of said telescoping assembly, and immediately above said telescoping assembly, said securing member having ends fixedly attached to said third housing, whereby vertical shaking of said telescoping assembly is dampened.

13. An extendable arm according to claim 10, further comprising: a holding spring having two ends secured to said third housing, said holding spring disposed transverse to the longitudinal axis of said first arm, and in contact with said first arm to bias said first arm downwardly and within said u-shaped groove.

* * * * *